US012560309B2

(12) United States Patent
Tamura et al.

(10) Patent No.: US 12,560,309 B2
(45) Date of Patent: Feb. 24, 2026

(54) LIGHT-EMITTING DEVICE

(71) Applicant: NICHIA CORPORATION, Anan (JP)

(72) Inventors: Kazuya Tamura, Anan (JP); Hirofumi Yoshida, Tokushima (JP); Yoshiki Endo, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/618,696

(22) Filed: Mar. 27, 2024

(65) Prior Publication Data

US 2024/0328604 A1 Oct. 3, 2024

(30) Foreign Application Priority Data

Mar. 27, 2023 (JP) ................................ 2023-050293
Feb. 22, 2024 (JP) ................................ 2024-026006

(51) Int. Cl.
*F21V 17/10* (2006.01)
*F21V 9/30* (2018.01)
*F21V 31/00* (2006.01)

(52) U.S. Cl.
CPC .............. *F21V 17/101* (2013.01); *F21V 9/30* (2018.02); *F21V 31/005* (2013.01)

(58) Field of Classification Search
CPC ......... F21V 17/101; F21V 9/30; F21V 31/005
See application file for complete search history.

(56) References Cited

U.S. PATENT DOCUMENTS 10,930,820 B2 * 2/2021 Kozuru ............... H01S 5/02315
2007/0201225 A1 8/2007 Holder et al.
2010/0225220 A1 * 9/2010 Tanaka .................. F21V 23/006 313/46
2013/0329397 A1 * 12/2013 Shimizu .................... F21V 7/26 362/84
2014/0084322 A1 * 3/2014 Park ...................... H01L 33/486 257/98
2014/0367718 A1 * 12/2014 Park ........................ H01L 33/48 438/26
2015/0070906 A1 3/2015 Cangemi et al.
2015/0098131 A1 4/2015 Grejda et al.
2015/0362158 A1 * 12/2015 Igata ....................... H01L 33/58 228/123.1

(Continued)

FOREIGN PATENT DOCUMENTS

CN 218849521 U 4/2023
JP 2005285871 A 10/2005

(Continued)

*Primary Examiner* — Tsion Tumebo

(74) *Attorney, Agent, or Firm* — Hunton Andrews Kurth LLP

(57) ABSTRACT

A light-emitting device includes a base member having an upper surface and a recess on an upper surface side; a light-emitting element disposed in the recess and configured to emit ultraviolet light; a light-transmissive member disposed on the upper surface; a first inorganic adhesive member disposed on the light-transmissive member; and a lens bonded to the light-transmissive member with the first inorganic adhesive member. An absolute value of a difference in linear expansion coefficient between the base member and the light-transmissive member is smaller than an absolute value of a difference in linear expansion coefficient between the base member and the lens.

20 Claims, 5 Drawing Sheets

(56) References Cited

U.S. PATENT DOCUMENTS

| | | | | |
|---|---|---|---|---|
| 2016/0341395 | A1* | 11/2016 | Kiyota | H01S 5/02216 |
| 2017/0052293 | A1 | 2/2017 | Cangemi et al. | |
| 2017/0122525 | A1 | 5/2017 | Root et al. | |
| 2020/0264500 | A1* | 8/2020 | Kozuru | H01S 5/02253 |
| 2021/0184423 | A1* | 6/2021 | Kanazawa | H01S 5/0236 |
| 2021/0249573 | A1 | 8/2021 | Ichinokura et al. | |
| 2021/0311375 | A1 | 10/2021 | Kaiser-Feuerstein et al. | |
| 2021/0384391 | A1 | 12/2021 | Someya | |
| 2022/0262996 | A1 | 8/2022 | Enomoto et al. | |

FOREIGN PATENT DOCUMENTS

| | | | |
|---|---|---|---|
| JP | 2009528556 | A | 8/2009 |
| JP | 2010128225 | A | 6/2010 |
| JP | 2016530572 | A | 9/2016 |
| JP | 2016532141 | A | 10/2016 |
| JP | 2018533034 | A | 11/2018 |
| JP | 2018535453 | A | 11/2018 |
| JP | 2019207426 | A | 12/2019 |
| JP | 2021097216 | A | 6/2021 |
| JP | 2021535424 | A | 12/2021 |
| JP | 2022060370 | A | 4/2022 |
| JP | 2022123425 | A | 8/2022 |
| WO | 2019235565 | A1 | 12/2019 |
| WO | 2020175396 | A1 | 9/2020 |

* cited by examiner

LIGHT-EMITTING DEVICE

CROSS REFERENCE TO RELATED APPLICATIONS

This application claims priority to Japanese Patent Application No. 2023-050293, filed on Mar. 27, 2023, and Japanese Patent Application No. 2024-026006, filed on Feb. 22, 2024, the entire disclosures of which are hereby incorporated herein by reference.

BACKGROUND

1. Field of the Invention

The present disclosure relates to a light-emitting device.

2. Description of Related Art

A light-emitting device has been disclosed that includes a light-emitting element disposed on an upper surface of a base member, a light-transmissive member disposed on the light-emitting element, a phosphor layer disposed on the light-transmissive member, and a cover member that is disposed above the phosphor layer and functions as a lens (for example, see Japanese Unexamined Patent Application Publication No. 2005-285871).

SUMMARY

However, in the light-emitting device disclosed in Japanese Unexamined Patent Application Publication No. 2005-285871, in the case in which the cover member that functions as a lens is disposed directly on the upper surface of the base member, if there is a large difference between the linear expansion coefficient of the base member and the linear expansion coefficient of the cover member that functions as a lens, stress is generated due to the expansion difference between the members, and the lens may be damaged or detached.

An object of an embodiment in the present disclosure is to provide a light-emitting device in which members are stably bonded together.

A light-emitting device according to an embodiment in the present disclosure includes a base member having an upper surface and a recess on an upper surface side; a light-emitting element disposed in the recess and configured to emit ultraviolet light; a light-transmissive member disposed on the upper surface of the base member; a first inorganic adhesive member disposed on the light-transmissive member; and a lens bonded to the light-transmissive member with the first inorganic adhesive member. An absolute value of a difference in linear expansion coefficient between the base member and the light-transmissive member is smaller than an absolute value of a difference in linear expansion coefficient between the base member and the lens.

According to certain embodiments of the present disclosure, a light-emitting device in which members are stably bonded together can be provided.

DETAILED DESCRIPTION

Figure 1:
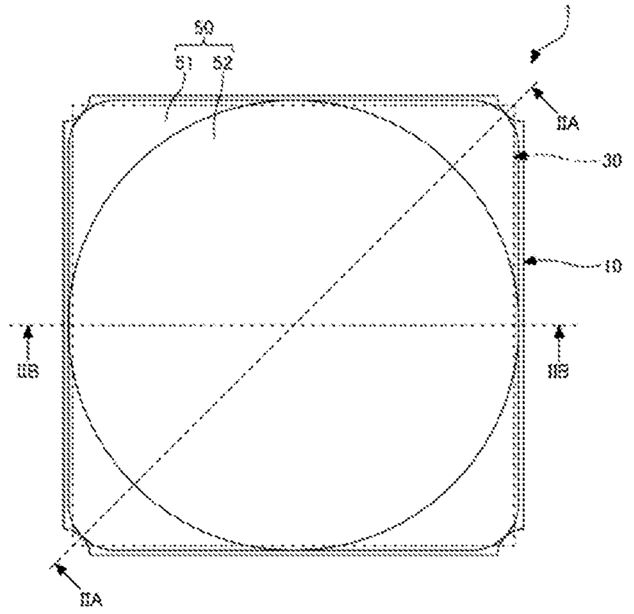
FIG. 1 is a schematic top view of a light-emitting device according to a first embodiment of the present disclosure.

A light-emitting device according to an embodiment in the present disclosure will be described in detail referring to the accompanying drawings. The modes to be described below are intended as examples of the light-emitting device to give concrete form to the technical idea of the present embodiment and are not limited to the description below. Unless specifically stated otherwise, descriptions of the sizes, materials, shapes, and relative positions of constituent units in the embodiment described below are not intended to limit the scope of the present disclosure to those descriptions, but are rather merely examples for description. Sizes or positional relationships of members illustrated in each drawing may be exaggerated in order to clarify the descriptions. Furthermore, in the descriptions below, the same name or the same reference numeral represents the same member or a similar material, and its duplicative description will be omitted as appropriate.

In the description below, terms representing particular directions or positions (such as "up/upper," "down/lower," and other terms containing the meanings of these terms) may be used. These terms are used merely for the sake of ease of description, representing relative directions or relative positions in the referenced drawings. Also, cross-sectional end views showing only cut surfaces of members may be used as cross-sectional views.

First Embodiment

Structure of Light-Emitting Device 1

Figure 2A:
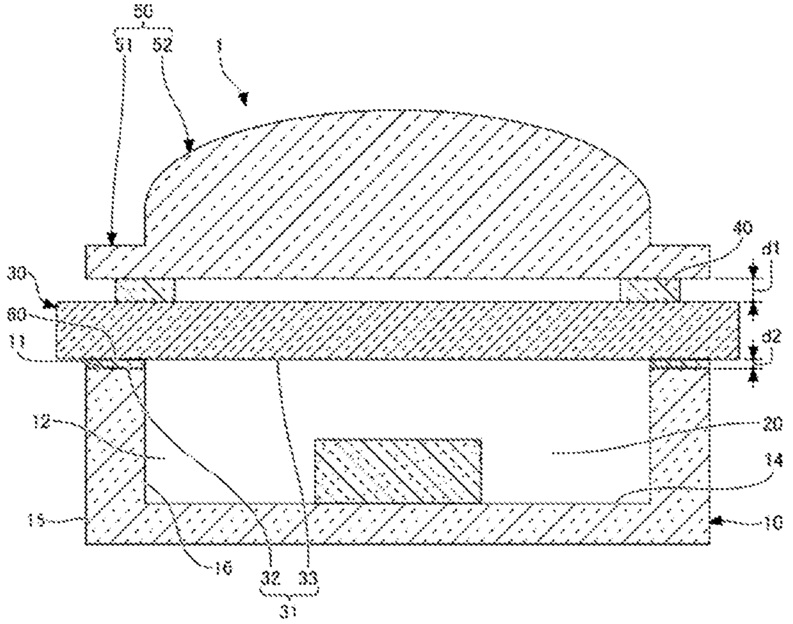
FIG. 2A is a schematic end view along the line IIA-IIA of FIG. 1.
Figure 2B:
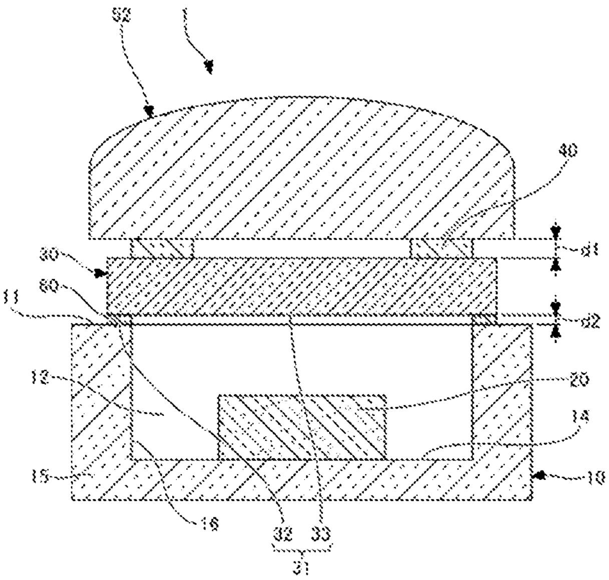
FIG. 2B is a schematic cross-sectional view along the line IIB-IIB of FIG. 1.
Figure 3:
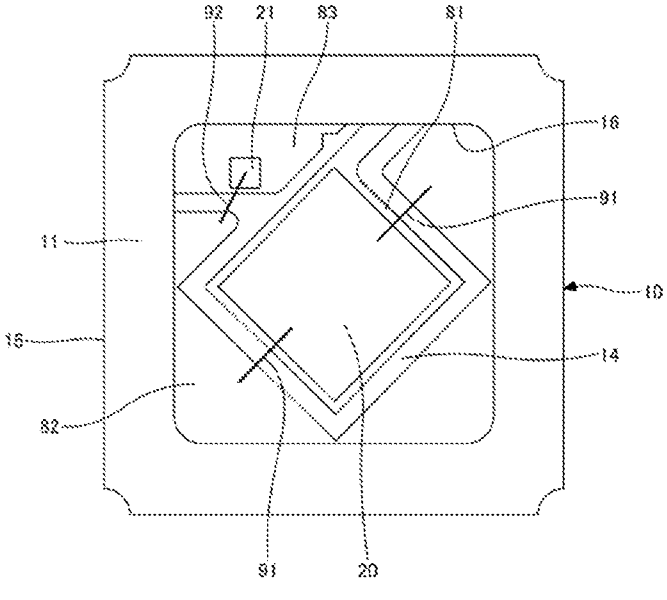
FIG. 3 is a schematic top view of a base member and a light-emitting element in the light-emitting device according to the first embodiment.
Figure 4:
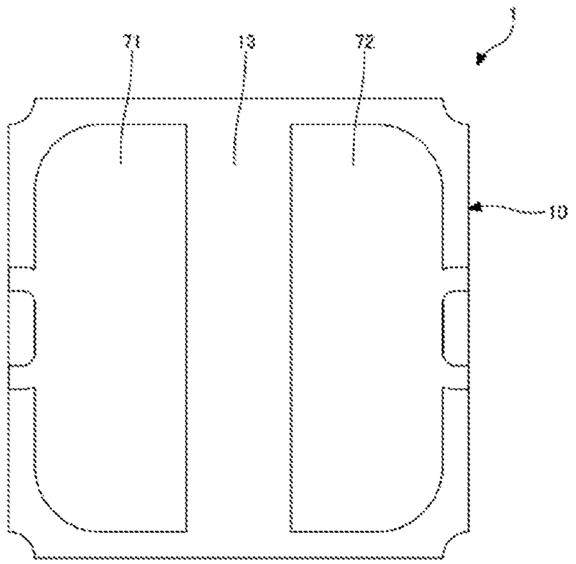
FIG. 4 is a schematic bottom view of the light-emitting device according to the first embodiment.

The structure of a light-emitting device 1 according to a first embodiment will be described referring to FIGS. 1 to 4. FIGS. 1 to 4 show an example of the structure of the light-emitting device 1. FIG. 1 is a schematic top view. FIG. 2A is a schematic end view along the line IIA-IIA of FIG. 1. FIG. 2B is a schematic cross-sectional view along the line IIB-IIB of FIG. 1. In FIG. 2A and FIG. 2B, metal wires 91 are omitted. FIG. 3 is a schematic top view of a base member 10 and a light-emitting element 20 in the light-emitting device 1. FIG. 3 shows a state in which a light-transmissive member 30 and a lens 50 are removed from the state of FIG. 1. FIG. 4 is a schematic bottom view.

In the present embodiment, the light-emitting device 1 includes the base member 10, the light-emitting element 20 that emits ultraviolet light, the light-transmissive member 30, first inorganic adhesive members 40, the lens 50, and a second inorganic adhesive member 60. The light-emitting device 1 is configured to radiate ultraviolet light emitted from the light-emitting element 20 and transmitted through the light-transmissive member 30 and the lens 50. For example, the light-emitting device 1 is used in an application in which ultraviolet light emitted from the light-emitting element 20 is applied to a resin material or a glass material to harden the resin material or glass material.

As shown in FIG. 1, in a top view, each of the base member 10 and the light-transmissive member 30 has a substantially rectangular outer shape. In a top view, the lens 50 has a substantially rectangular outer shape having rounded corners. The rectangular shape is a shape including four sides and four corners. The substantially rectangular shape includes a rectangular shape, a shape formed by removing a portion of corner portions of a rectangular shape, and a rectangular shape with rounded corners. In the example shown in FIG. 1, the base member 10 has a substantially rectangular shape in which portions of corners are removed in a top view. The light-transmissive member 30 has a rectangular shape in a top view. The outer shape of each of the base member 10 and the light-transmissive member 30 in a top view is not limited to a substantially rectangular shape but may be a substantially circular shape, a substantially elliptic shape, a substantially polygonal shape, or the like. The outer shape of the lens 50 in a top view is not limited to a substantially rectangular shape having rounded corners but may be a substantially circular shape, a substantially elliptic shape, a substantially polygonal shape, or the like.

As shown in FIG. 2A and FIG. 2B, the base member 10 has an upper surface 11 and a recess 12 formed on the upper surface 11 side. The upper surface 11 of the base member 10 is an upper surface of a lateral wall portion 15. The recess 12 is defined by an inner lateral surface 16 of the lateral wall portion 15 and a base surface 14. The base surface 14 defines a bottom of the recess 12.

The light-emitting element 20 is disposed in the recess 12. The light-emitting element 20 emits ultraviolet light. For example, a peak wavelength of the ultraviolet light emitted from the light-emitting element 20 is 200 nm or more and 410 nm or less. The light-emitting element 20 is disposed on the base surface 14 of the base member 10. In the case in which the light-emitting element 20 has a substantially rectangular shape in a top view, the light-emitting element 20 is preferably disposed such that a bisector of an angle of a vertex of the light-emitting element 20 substantially perpendicularly intersects a side of the base member 10 in a top view. With such an arrangement, absorption of light emitted from the light-emitting element 20 by the inner lateral surface 16 of the base member 10 can be reduced. Alternatively, the light-emitting element 20 may be disposed such that a side of the light-emitting element 20 is substantially parallel to a side of the base member 10. The light-emitting element 20 is located in a space of the recess 12. The space of the recess 12 is defined by the inner lateral surface 16 of the lateral wall portion 15, the base surface 14, and a lower surface 31 of the light-transmissive member 30.

The light-transmissive member 30 is disposed on the upper surface 11 of the base member 10. The light-transmissive member 30 is transmissive of at least light emitted from the light-emitting element 20. The light-transmissive member 30 transmits 60% or more, preferably 90% or more of light emitted from the light-emitting element 20.

The light-transmissive member 30 is disposed on the base member 10 above the space of the recess 12, in which the light-emitting element 20 is disposed, to cover the space of the recess 12. With the light-transmissive member 30 located above the space of the recess 12 and covering the space of the recess 12, the light-emitting element 20 can be protected against moisture, organic matter, and the like contained in the outside air. The lower surface 31 of the light-transmissive member 30 includes a first region 32, located directly above the upper surface 11 of the base member 10, and a second region 33 located directly above the base surface 14. The second region 33 faces the upper surface of the light-emitting element 20 across the space inside the recess 12.

The light-transmissive member 30 has a plate-like outer shape. The light-transmissive member 30 has a rectangular shape in a top view. Corner portions of the light-transmissive member 30 may be beveled or the like. The shape of the light-transmissive member 30 can be appropriately selected according to an intended application or the like of the light-emitting device 1. In consideration of covering the space of the recess 12 by light-transmissive member 30 above the space of the recess 12 so as to enhance airtightness of the space of the recess 12, at least the lower surface 31 of the light-transmissive member 30 is preferably a flat surface. In a top view, in a direction perpendicular to one side of the base member 10, a length of the light-transmissive member 30 is shorter than a length of the base member 10. In a top view, in both of directions perpendicular to and parallel to one side of the base member 10, lengths of the light-transmissive member 30 are shorter than lengths of the base member 10. On the other hand, in a top view, on a diagonal of the base member 10, a length of the light-transmissive member 30 is greater than a length of the base member 10. At each corner portion of the light-transmissive member 30, the light-transmissive member 30 protrudes outward of the base member 10 in a top view. With such a structure, the area of the lower surface 31 of the light-transmissive member 30 can be increased, so that the bonding region with the base member 10 can be sufficiently secured.

In the present embodiment, the light-transmissive member 30 may contain sapphire. In the case in which the base material of the base member 10 contains a ceramic, the difference in linear expansion coefficient between sapphire and the ceramic is small. Accordingly, with the light-transmissive member 30 containing sapphire, the expansion difference between the base member 10 and the light-transmissive member 30 can be reduced even if the temperature around the light-emitting device 1 changes, and stress exerted due to the expansion difference between the base member 10 and the light-transmissive member 30 and decrease in the bonding force between the base member 10 and the light-transmissive member 30 can be reduced. The material of the light-transmissive member 30 is not limited to sapphire but may be selected such that the condition is satisfied that the absolute value of the difference in linear expansion coefficient between the base member 10 and the light-transmissive member 30 is smaller than the absolute value of the difference in linear expansion coefficient between the base member 10 and the lens 50.

The second inorganic adhesive member 60 is disposed on the upper surface 11 and bonds the light-transmissive member 30 to the base member 10. The first inorganic adhesive members 40 are disposed on the light-transmissive member 30. The lens 50 is bonded to the light-transmissive member 30 with the first inorganic adhesive members 40. A thickness d1 shown in FIG. 2A is the thickness of the first inorganic adhesive members 40. A thickness d2 is the thickness of the second inorganic adhesive member 60. For example, the thickness d1 may be 10 μm or more and 1,000 μm or less, more preferably 50 μm or more and 150 μm or less. For example, the thickness d2 is preferably 1 μm or more and 100 μm or less, more preferably 20 μm or more and 40 μm or less. In the present embodiment, the thickness d1 is greater than the thickness d2. In some cases, the second inorganic adhesive member 60 serving to enhance the air-tightness of the space of the recess 12 preferably has a thickness smaller than the thickness of the first inorganic adhesive members 40 that are only required to fix the lens 50. By increasing the thickness of the first inorganic adhesive members 40, the bonding force between the light-transmissive member 30 and the lens 50 can be enhanced. With the large thickness d1 of the first inorganic adhesive members 40, stress exerted to the lens 50 can be reduced by the first inorganic adhesive members 40. At least a portion of the first inorganic adhesive members 40 may be located inward of the inner edge of the second inorganic adhesive member 60 in a top view.

In one example, the first inorganic adhesive members 40 are adhesive members containing an inorganic material such as an inorganic polymer as a base material. Examples of the inorganic material include ceramic-based materials, cement-based materials, sodium silicate, and aluminum phosphate. A mixture containing silica and an alkali metal may be used as the inorganic material. The first inorganic adhesive members 40 are members in a state in which an adhesive of an inorganic material has been hardened. The first inorganic adhesive members 40 are resistant to high temperatures and can stabilize bonding between members under a high temperature environment. The first inorganic adhesive members 40 are resistant to ultraviolet rays and can stabilize bonding between members under an environment in which the members are exposed to ultraviolet rays. For example, the first inorganic adhesive member 40 may be an adhesive member containing a metal material such as gold tin, a solder alloy, gold paste, silver paste, and a brazing filler metal as a base material. If the first inorganic adhesive member 40 is an adhesive member containing a metal material as a base material, a metal film can be disposed on each of the light-transmissive member 30 and the lens 50, and the respective metal films can be joined by the first inorganic adhesive member 40. When the metal film corresponding to the second inorganic adhesive member 60 is disposed on the light-transmissive member 30, the metal film corresponding to the second inorganic adhesive member 60 may be disposed separately from the metal film corresponding to the first inorganic adhesive member 40.

For example, the second inorganic adhesive member 60 is an adhesive member containing a metal material such as gold tin, a solder alloy, gold paste, silver paste, and a brazing filler metal as a base material. The second inorganic adhesive member 60 bonds the base member 10 to the light-transmissive member 30. More specifically, a metal film is disposed on each of the base member 10 and the light-transmissive member 30, and the respective metal members are bonded together with the second inorganic adhesive member 60 to seal the space inside the recess 12. By using the second inorganic adhesive member 60 for bonding of the base member 10 to the light-transmissive member 30 to maintain the space of the recess 12 in a hermetically sealed state, deterioration of the light-emitting element 20 can be suppressed.

The lens 50 transmits light emitted from the light-emitting element 20. The lens 50 can transmit light emitted from the light-emitting element 20 and converge or diverge the light to allow the light to be emitted. The lens 50 is a plano-convex lens in which a surface facing the light-transmissive member 30 is a flat surface, and the surface opposite to the surface facing the light-transmissive member 30 is a convex surface. Alternatively, the lens 50 may be a plano-concave lens in which the surface opposite to the surface facing the light-transmissive member 30 is a concave surface. The lens 50 may be a lens array having a plurality of convex surfaces or concave surfaces on the side opposite to the surface facing the light-transmissive member 30. The lens 50 may be a Fresnel lens, a diffractive lens, or the like. The lens 50 contains a glass (such as borosilicate glass and quartz glass) material and the like.

The lens 50 may include a flange portion 51 and a lens portion 52. The flange portion 51 is located outward of the lens portion 52 in a top view. The flange portion 51 includes the corner portions of the lens 50. In FIG. 1, the flange portion 51 constitutes the four corner portions of the lens. The flange portion 51 is a portion to which mainly the first inorganic adhesive members 40 are bonded when the lens 50 is fixed by the first inorganic adhesive members 40. The entirety of the first inorganic adhesive members 40 does not necessarily have to be bonded to the flange portion 51. By applying at least a portion of the first inorganic adhesive members 40 to the flange portion 51, the first inorganic adhesive members 40 are inhibited from blocking light incident on the central portion of the lens 50. The lens portion 52 has a lens surface and functions as a lens. In the lens 50, a portion coincides the lens surface in a top view can be defined as the lens portion 52. A portion of the outer edge of the lens portion 52 overlaps the upper surface 11 in a top view. Another portion of the outer edge of the lens portion 52 overlaps the recess 12 in a top view.

In a top view, on the perpendicular bisector of one side of the light-transmissive member 30, a length of the lens 50 is greater than a length of the light-transmissive member 30. In one example, in a top view, both on the perpendicular bisector of one side of the light-transmissive member 30 and on the perpendicular bisector of a side intersecting the side, lengths of the lens 50 are greater than corresponding lengths of the light-transmissive member 30. In a top view, on a diagonal of the light-transmissive member 30, a length of the lens 50 is shorter than a length of the light-transmissive member 30. The point of intersection of the outer edge of the lens portion 52 and this diagonal is located at a position overlapping the recess 12 in a top view. The first inorganic adhesive members 40 are disposed near the corner portions of the lens 50. The flange portion 51 constitutes the corner portions of the lens 50, and the lens 50 is shorter than the light-transmissive member 30, so that the first inorganic adhesive members 40 can be disposed inward of the second inorganic adhesive member 60, and the stress exerted on the lens can be reduced.

As shown in FIGS. 3 and 4, the base member 10 includes a first upper surface wiring 81, a second upper surface wiring 82, a third upper surface wiring 83, a first lower surface wiring 71, and a second lower surface wiring 72. The base member 10 is constituted using an insulating base material as a main material. For example, the insulating base material includes a ceramic. The ceramic preferably has high heat and weather resistance. As the ceramic, for example, aluminum nitride, aluminum oxide, or mullite can be used.

As shown in FIG. 3, the light-emitting element 20 is disposed on the first upper surface wiring 81. A lower surface electrode is disposed at the lower surface of the light-emitting element 20. For example, the lower surface electrode of the light-emitting element 20 is bonded to the first upper surface wiring 81 with solder or electroconductive paste therebetween and electrically connected to the first upper surface wiring 81. An upper surface electrode is disposed on the upper surface of the light-emitting element 20. The upper surface electrode is electrically connected to the second upper surface wiring 82 via the metal wires 91 (such as Au wires).

An electrostatic discharge (ESD) protection diode 21 is disposed on the third upper surface wiring 83. For example, the ESD protection diode 21 is a Zener diode. A lower surface electrode is formed on the lower surface of the ESD protection diode 21. For example, the lower surface electrode is bonded to the third upper surface wiring 83 with solder or electroconductive paste therebetween and electrically connected to the third upper surface wiring 83. An upper surface electrode is formed on the upper surface of the ESD protection diode 21. The upper surface electrode is electrically connected to the second upper surface wiring 82 via a metal wire 92 (such as a Au wire).

As shown in FIG. 4, the first lower surface wiring 71 and the second lower surface wiring 72 are disposed on a lower portion 13 of the base member 10. Anode potential is applied to one of the first lower surface wiring 71 and the second lower surface wiring 72, and cathode potential is applied to the other of the first lower surface wiring 71 and the second lower surface wiring 72. One of the first upper surface wiring 81 and the second upper surface wiring 82 shown in FIG. 3 is electrically connected to one of the first lower surface wiring 71 and the second lower surface wiring 72. The other one of the first upper surface wiring 81 and the second upper surface wiring 82 shown in FIG. 3 is electrically connected to the other one of the first lower surface wiring 71 and the second lower surface wiring 72. The third upper surface wiring 83 shown in FIG. 3 is electrically connected to the one of the first lower surface wiring 71 and the second lower surface wiring 72 connected to the first upper surface wiring 81.

In the present embodiment, the absolute value of the difference in linear expansion coefficient between the base member 10 and the light-transmissive member 30 is smaller than the absolute value of the difference in linear expansion coefficient between the base member 10 and the lens 50. For example, the absolute value of the difference in linear expansion coefficient between the base member 10 and the light-transmissive member 30 is less than $3\times10^{-6}$ ($K^{-1}$). In the case in which the lens 50 is directly bonded to the base member 10 without the light-transmissive member 30, the lens 50 may be damaged or detached due to the stress caused by the difference in linear expansion coefficient between the base member 10 and the lens 50. In particular, in the case in which the base member 10 is hermetically sealed by the lens 50, the lens 50 is required to be bonded to the base member 10 using an adhesive member based on a metal such that no gap is generated between these two members. The bonding region thus increases, stress applied due to the difference in linear expansion coefficient also increases, and the possibility that the lens 50 is damaged or detached also increases. On the other hand, in the present embodiment, stress exerted to the lens 50 can be reduced by bonding the lens 50 to the light-transmissive member 30 compared with the case in which the lens 50 is bonded to the base member 10 without the light-transmissive member 30. Accordingly, in the present embodiment, decrease in the bonding force of the lens 50 due to changes in the temperature around the light-emitting device 1 or the like can be reduced, and the light-emitting device 1 with stable bonding between the light-transmissive member 30 and the lens 50 can be provided. In the present embodiment, damage or detachment of the lens 50 due to stress exerted to the lens 50 can be suppressed. Further, in the present embodiment, the light-transmissive member 30 hermetically sealing the base member 10 is less likely to be affected by the exerted stress than the lens 50. Accordingly, the light-emitting device 1 in which damage or detachment of the light-transmissive member 30 is less likely to occur and the hermetically sealed state is less likely to be broken than in the case in which the base member 10 is hermetically sealed by the lens 50 can be provided.

In the present embodiment, by bonding the lens 50 to the light-transmissive member 30 disposed on the upper surface 11 of the base member 10 with the first inorganic adhesive members 40, the distance between the light-emitting element 20 and the lens 50 can be reduced compared with the case in which the lens 50 is not fixed to the light-transmissive member 30 but spaced apart from the light-transmissive member 30. In the present embodiment, compared with the case in which the lens 50 is spaced apart from the light-transmissive member 30, the optical loss due to prevention of ultraviolet light emitted from the light-emitting element 20 from being incident on the lens 50 can thus be reduced, and the efficiency of irradiation of ultraviolet light by the light-emitting device 1 can be enhanced.

In the present embodiment, as shown in FIG. 2A, the thickness d1 of the first inorganic adhesive members 40 is greater than the thickness d2 of the second inorganic adhesive member 60. Increase in the thickness of the first inorganic adhesive members 40 allows stress due to the difference in linear expansion coefficient between the light-transmissive member 30 and the lens 50 to be reduced, which allows for preventing decrease in the bonding force between the light-transmissive member 30 and the lens 50, so that the light-emitting device 1 in which members are stably bonded together can be provided. The thickness d1 of the first inorganic adhesive members 40 is not necessarily greater than the thickness d2 of the second inorganic adhesive member 60.

In the present embodiment, in a top view, in a direction perpendicular to one side of the light-transmissive member 30, the length of the lens 50 is greater than the length of the light-transmissive member 30. By increasing the size of the lens 50, the extraction efficiency of light emitted from the light-emitting element 20 can be increased. Further, in the present embodiment, the corner portions of the lens 50 are rounded in a top view. In the case in which the corner portions of the lens 50 are not rounded and positions of arrangement are on the corner portions distant from the center of the lens 50, stress exerted on the lens 50 from the first inorganic adhesive members 40 increases. On the other hand, in the case in which the corner portions of the lens 50 are rounded, the first inorganic adhesive members 40 are not disposed at positions distant from the center of the lens 50. With this structure, the stress exerted to the lens 50 from the first inorganic adhesive members 40 can be reduced.

In the present embodiment, the thickness of the flange portion 51 is smaller than the thickness of the light-transmissive member 30. The light-transmissive member 30 is required to have a certain thickness to reduce stress exerted by the base member 10. On the other hand, the flange portion 51 included in the lens 50 can bear the exerted stress even with a smaller thickness than the light-transmissive member 30 because the stress is reduced by the first inorganic adhesive members 40. Accordingly, the thickness of the flange portion 51 can be reduced compared with the case in which the lens 50 is directly bonded to the base member 10 without the light-transmissive member 30. Further, as compared with the structure in which the base member 10 is directly sealed by the lens 50, with the structure in which the light-transmissive member 30 and the lens 50 are separate members and the flange portion 51 with a smaller thickness than the light-transmissive member 30 is formed in the lens 50 to bond the light-transmissive member 30 and the lens 50 together, the stress exerted on the lens 50 can be reduced. From the above viewpoint, for example, the thickness of the flange portion 51 is preferably 80% or less of the thickness of the light-transmissive member 30. With this structure, the size of the lens 50 can be reduced, and the production costs can be reduced. By reducing the size of the lens 50, the size of the light-emitting device 1 can be reduced.

Example of Arrangement of First Inorganic Adhesive Members 40

Figure 5:
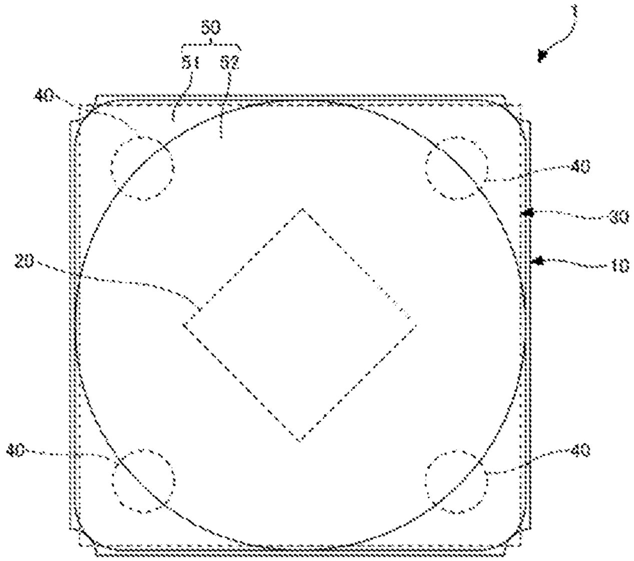
FIG. 5 is a schematic top view showing a first example of the arrangement of first inorganic adhesive members in the light-emitting device according to the first embodiment.
Figure 6:
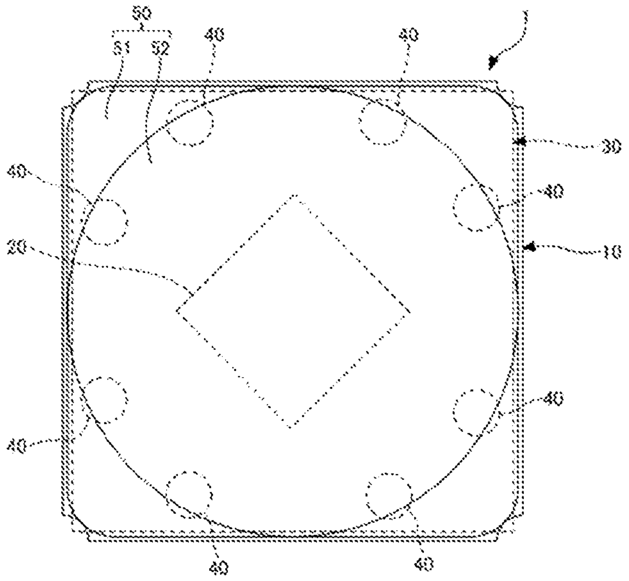
FIG. 6 is a schematic top view showing a second example of the arrangement of the first inorganic adhesive members in the light-emitting device according to the first embodiment.

The arrangement of the first inorganic adhesive members 40 will be described in detail referring to FIGS. 5 and 6. FIG. 5 is a schematic top view showing a first example of the arrangement of the first inorganic adhesive members 40. FIG. 6 is a schematic top view showing a second example of the arrangement of the first inorganic adhesive members 40.

As shown in FIG. 5, in the present embodiment, between the lens 50 and the light-transmissive member 30, there may be a region in which the first inorganic adhesive members 40 are present and a region in which the first inorganic adhesive members 40 are not present. In the present embodiment, the first inorganic adhesive members 40 may be disposed in a plurality of regions spaced apart from each other. In the example shown in FIG. 5, the first inorganic adhesive members 40 are disposed in four regions spaced apart from each other.

The first inorganic adhesive members 40 in the four regions are respectively disposed near the four corners of the light-transmissive member 30 in a top view. Each of the first inorganic adhesive members 40 includes a portion overlapping the flange portion 51 in a top view. Each of the first inorganic adhesive members 40 can include a portion not overlapping the flange portion 51 in a top view. Each of the first inorganic adhesive members 40 extends over the lens portion and the flange portion with the outer edge of the lens surface being the boundary in a top view. With the first inorganic adhesive members 40 disposed at positions overlapping the flange portion 51 in a top view, the first inorganic adhesive members 40 can be inhibited from blocking light incident on the central portion of the lens 50. With this structure, the light extraction efficiency of the light-emitting device 1 is enhanced.

The first inorganic adhesive members 40 are present on the flange portion 51 in a region closer to the center of the lens 50 than a region near the outer edges of the flange portion 51 in a top view. In particular, in FIG. 5, a portion of the first inorganic adhesive members 40 overlaps the flange portion 51 in a top view. With this structure, the stress exerted to the lens 50 from the first inorganic adhesive members 40 can be reduced.

The first inorganic adhesive members 40 are disposed at positions through which the perpendicular bisectors of the sides of the light-emitting element 20 pass in a top view. With this arrangement, the shortest distance between a respective first inorganic adhesive member 40 and the light-emitting element 20 increases in a top view, and blocking of light emitted from the light-emitting element 20 by the first inorganic adhesive members 40 can be reduced. Alternatively, in a top view, the first inorganic adhesive members 40 may be disposed at positions through which virtual straight lines including the diagonals of the light-emitting element 20 pass. With this arrangement, the shortest distance between each of the first inorganic adhesive members 40 and a midpoint of a corresponding side of the light-emitting element 20 increases in a top view, and blocking of light emitted from the sides of the light-emitting element 20 by the first inorganic adhesive members 40 can be reduced.

As there are the region in which the first inorganic adhesive members 40 are present and the region in which the first inorganic adhesive members 40 are not present between the lens 50 and the light-transmissive member 30, the region in which ultraviolet light emitted from the light-emitting element 20 does not incident on the first inorganic adhesive members 40 can be increased while the bonding force between the lens 50 and the light-transmissive member 30 is sufficiently secured. This allows for inhibiting decrease in the output due to blocking of ultraviolet light emitted from the light-emitting element 20 by the first inorganic adhesive members 40. If the area of the region in which the first inorganic adhesive members 40 overlap the lens 50 in a top view is 20% or less of the area of the lens 50, the bonding force between the light-transmissive member 30 and the lens 50 can be sufficiently secured, and decrease in the output due to blocking of ultraviolet light emitted from the light-emitting element 20 by the first inorganic adhesive members 40 can be suppressed.

In the present embodiment, the first inorganic adhesive members 40 are disposed in a plurality of regions spaced apart from each other, so that the amount of the first inorganic adhesive members 40 to be used for the manufacture of a single light-emitting device 1 can be reduced compared with the case in which the first inorganic adhesive member 40 is disposed in a frame-shaped region that is not divided. It is also possible to inhibit decrease in the overall output from the device due to arrangement of the first inorganic adhesive members 40 at positions on which light emitted from the light-emitting element 20 is incident. This allows for reducing the amount of the first inorganic adhesive members 40 to be used, so that the cost of the light-emitting device 1 can be reduced. Further, the hardening time of the first inorganic adhesive members 40 can be shortened to enhance the producibility of the light-emitting device 1. Furthermore, reducing the amount of the first inorganic adhesive members 40 to be used allows for inhibiting decrease in the output due to blocking of ultraviolet light emitted from the light-emitting element 20 by the first inorganic adhesive members 40.

As the region in which the first inorganic adhesive members 40 are arranged decreases, the amount of the first inorganic adhesive members 40 to be used can be reduced, the hardening time of the first inorganic adhesive members 40 can be shortened, so that the producibility of the light-emitting device 1 can be enhanced. Further, reducing the region in which the first inorganic adhesive members 40 are arranged allows for inhibiting decrease in the output due to blocking of ultraviolet light emitted from the light-emitting element 20 by the first inorganic adhesive members 40. On the other hand, as shown in FIG. 6, the number of regions in which the first inorganic adhesive members 40 are arranged may be increased to eight. By increasing the regions in which the first inorganic adhesive members 40 are arranged, the bonding force between the light-transmissive member 30 and the lens 50 can be improved.

Further, in the present embodiment, the first inorganic adhesive member 40 may be disposed throughout between the light-transmissive member 30 and the lens 50. That is, the first inorganic adhesive member 40 may be disposed in the entire region in which the lower surface of the lens 50 is in contact with the light-transmissive member 30. With the first inorganic adhesive member 40 included in the entire region between the light-transmissive member 30 and the lens 50, the area of bonding between the light-transmissive member 30 and the lens 50 can be increased. Accordingly, the present embodiment allows for providing the light-emitting device 1 in which bonding force between the light-transmissive member 30 and the lens 50 are enhanced and bonding between members are stable. In this case, the first inorganic adhesive member 40 preferably transmits ultraviolet light.

As shown in FIG. 5, in the present embodiment, the first inorganic adhesive members 40 may be arranged at positions not overlapping the light-emitting element 20 in a top view. By disposing the first inorganic adhesive members 40 at positions not overlapping the light-emitting element 20, the amount of ultraviolet light applied to the first inorganic adhesive members 40 within ultraviolet light emitted from the light-emitting element 20 can be reduced. In the present embodiment, deterioration of the first inorganic adhesive members 40 due to exposure to the ultraviolet light from the light-emitting element 20 can thus be reduced, and decrease in the bonding force between the light-transmissive member 30 and the lens 50 due to the deterioration of the first inorganic adhesive members 40 can be reduced.

Example of Arrangement of Second Inorganic Adhesive Member 60

Figure 7:
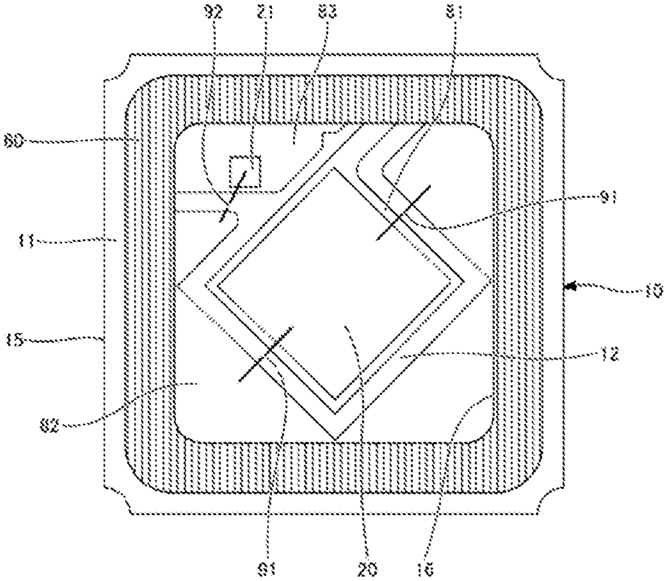
FIG. 7 is a schematic top view showing an example of the arrangement of a second inorganic adhesive member in the light-emitting device according to the first embodiment.

The arrangement of the second inorganic adhesive member 60 will be described in detail referring to FIG. 7. FIG. 7 is a schematic top view showing an example of the arrangement of the second inorganic adhesive member 60 in the light-emitting device 1. As with FIG. 3, FIG. 7 shows a state in which the light-transmissive member 30 and the lens 50 are removed from the state of FIG. 1.

As shown in FIG. 7, in the present embodiment, the second inorganic adhesive member 60 may be disposed on the upper surface 11 of the base member 10 to have a frame shape. The term "frame shape" as used herein refers to a shape that is not separated into regions but that is of a continuous frame. In the example shown in FIG. 7, the upper surface 11 of the base member 10 has a substantially rectangular shape in a top view, and the second inorganic adhesive member 60 is therefore disposed on the upper surface 11 of the base member 10 to have a substantially rectangular frame shape. The second inorganic adhesive member 60 is not limited to a substantially rectangular frame shape but may have a substantially circular frame shape, substantially elliptic frame shape, or substantially polygonal frame shape corresponding to the shape of the upper surface 11 of the base member 10 in a top view.

With the second inorganic adhesive member 60 disposed in a frame shape, the second inorganic adhesive member 60 can be allowed to function as a sealing member that seals the gap between the base member 10 and the light-transmissive member 30. This allows for reducing entry of gas, liquid, solid, or the like into the space of the recess 12 from outside the light-emitting device 1, so that the airtightness of the space of the recess 12 can be enhanced. With the second inorganic adhesive member 60 disposed in a frame shape, the area of bonding between the light-transmissive member 30 and the base member 10 can be increased, and the bonding force between the base member 10 and the light-transmissive member 30 can be enhanced, so that the light-emitting device 1 in which members are stably bonded together can be provided.

In the case in which the second inorganic adhesive member 60 is disposed in a frame shape, it is sufficient that the second inorganic adhesive member 60 has a frame shape when the bonding of the base member 10 and the light-transmissive member 30 has been completed. In other words, the case in which the second inorganic adhesive member 60 is disposed in a frame shape includes a case in which the second inorganic adhesive member 60 is not continuous in the middle of a bonding step of the base member 10 and the light-transmissive member 30.

In the present embodiment, the light-transmissive member 30 may hermetically seal the recess 12. By hermetically sealing the recess 12 with the light-transmissive member 30, the airtightness of the space inside the recess 12 can be improved, so that deterioration of the light-emitting element 20, breakage of the metal wires 91, and the like due to entry of gas, liquid, solid, or the like can be reduced.

Second Embodiment

Figure 8:
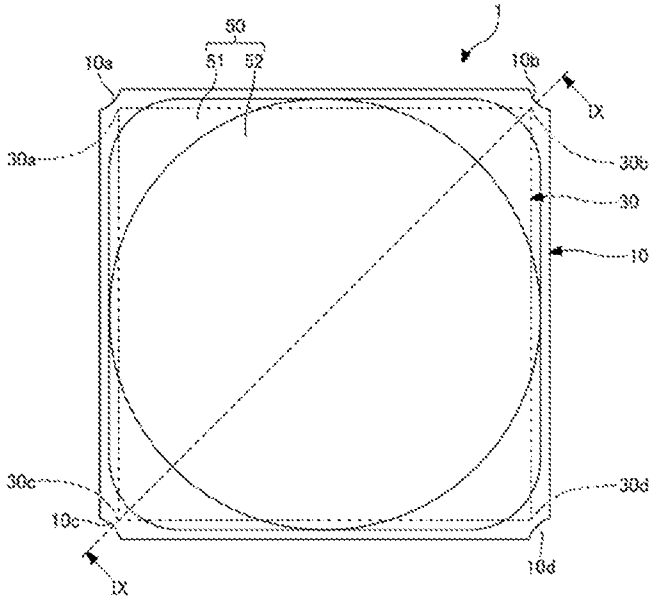
FIG. 8 is a schematic top view of a light-emitting device according to a second embodiment of the present disclosure.
Figure 9:
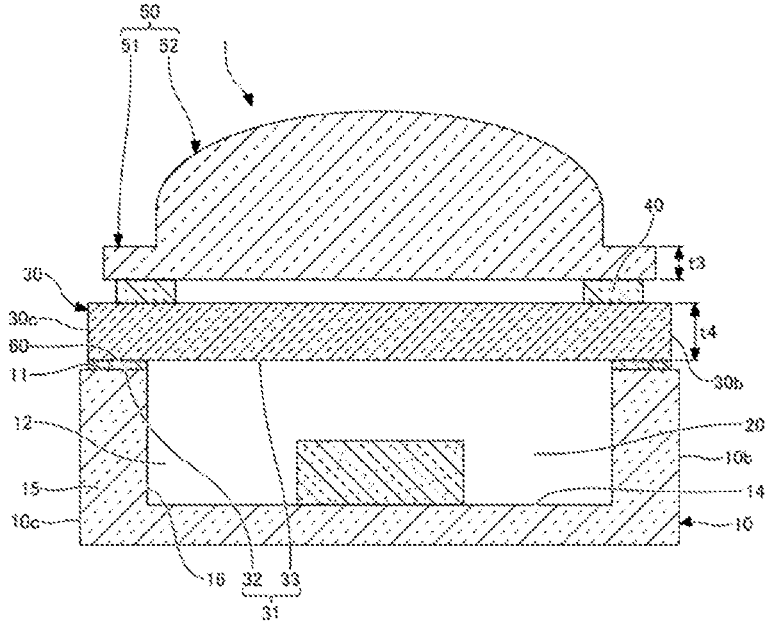
FIG. 9 is a schematic end view along the line IX-IX of FIG. 8.

The structure of a light-emitting device according to a second embodiment will be described referring to FIGS. 8 and 9. FIG. 8 is a schematic top view of a light-emitting device according to a second embodiment. FIG. 9 is a schematic end view along the line IX-IX of FIG. 8. The same names and reference numerals as in the previously described embodiments indicate the same or similar materials or configurations, and detailed explanations thereof are omitted as appropriate.

This embodiment differs from the first embodiment in that the corner portions of the light-transmissive member 30 do not extend outward beyond the beveled corners in the base member 10.

In the example shown in FIGS. 8 and 9, in the top view, the four corners of the base member 10 includes beveled portions 10*a*, 10*b*, 10*c*, and 10*d*. In the top view, the corner portion 30*a* of the light-transmissive member 30 is located inward of the portion 10*a*, and the corner portion 30*b* of light-transmissive member 30 is located inward of the portion 10*b*. In the top view, the corner portion 30*c* of the light-transmissive member 30 is located inward of the portion 10*c*, and the corner portion 30*d* of light-transmissive member 30 is located inward of the portion 10*d*. In other words, the corner portions 30*a*, 30*b*, 30*c* and 30*d* of the light-transmissive member 30 do not extend outward beyond the beveled corner portions 10*a*, 10*b*, 10*c* and 10*d* in the base member 10. With such a configuration, the material of the light-transmissive member 30 can be saved, reducing the cost of the light emitting device 1, and the stress load in the first inorganic adhesive member 40 can be reduced.

In a top view, the corner portions 30*a*, 30*b*, 30*c* and 30*d* of the light-transmissive member 30 do not overlap with the lens 50, but are exposed. That is, in a top view, on a diagonal of the base member 10, a length of the light-transmissive member 30 is greater than a length of the lens 50. With this structure, relative positional relationship between the light-transmissive member 30 and the lens 50 can be easily confirmed in a top view. A portion of the light-transmissive member 30 other than the corner portions 30*a*, 30*b*, 30*c* and 30*d* overlaps with the lens 50. That is, in a top view, on the perpendicular bisector of one side of the base member 10, a length of the light-transmissive member 30 is smaller than a length of the lens 50. With such a configuration, the material of the light-transmissive member 30 can be saved, and light extraction efficiency of the lens 50 can be increased.

A thickness t3 in FIG. 9 indicates a thickness of the flange portion 51. The thickness t3 is, for example, 0.35 mm. A thickness t4 in FIG. 9 indicates a thickness of the light-transmissive member 30. The thickness t4 is, for example, 0.50 mm.

Certain embodiments have been described above in detail, but the present invention is not limited to the embodiments described. Modifications or replacement in a wide range can be carried out in the embodiment described above within the scope specified by the claims.

The numbers for the ordinal numerals, quantities, and the like used in the description of the embodiment are all examples for specifically describing the technique of the present disclosure, and the present disclosure is not limited to the exemplified numbers. The relationship of connection between components is an example given for specifically describing the technique of the present disclosure and does not limit the relationship of connection for implementing the function of the present disclosure.

The light-emitting device of the present disclosure can provide a light-emitting device in which members are stably bonded together, and the light-emitting device can therefore be suitably used for a printing or exposure application or the like in which ultraviolet light is applied to an object to harden the object. The light-emitting device of the present disclosure is not limited to these applications.

What is claimed is:

1. A light-emitting device comprising:

a base member having an upper surface and a recess on an upper surface side;

a light-emitting element disposed in the recess and configured to emit ultraviolet light;

a light-transmissive member disposed on the upper surface of the base member;

a first inorganic adhesive member disposed on the light-transmissive member; and a lens bonded to the light-transmissive member with the first inorganic adhesive member, wherein an absolute value of a difference in linear expansion coefficient between the base member and the light-transmissive member is smaller than an absolute value of a difference in linear expansion coefficient between the base member and the lens, wherein the lens includes a lens portion and a flange portion located outward of the lens portion in a top view, wherein the thickness of the flange portion is smaller than the thickness of the light-transmissive member, and wherein, in the top view, on a diagonal of the light-transmissive member, a length of the lens is shorter than a length of the light-transmissive member.

2. The light-emitting device according to claim 1, wherein the absolute value of the difference in linear expansion coefficient between the base member and the light-transmissive member is less than $3\times10^{-6}$ ($K^{-1}$).

3. The light-emitting device according to claim 1, wherein the light-transmissive member contains sapphire.

4. The light-emitting device according to claim 1, further comprising a second inorganic adhesive member disposed on the upper surface of the base member and bonding the light-transmissive member and the base member, wherein the second inorganic adhesive member has a frame shape.

5. The light-emitting device according to claim 4, wherein the light-transmissive member hermetically seals the recess.

6. The light-emitting device according to claim 4, wherein a thickness of the first inorganic adhesive member is greater than a thickness of the second inorganic adhesive member.

7. The light-emitting device according to claim 1, wherein a first region between the lens and the light-transmissive member is provided with the first inorganic adhesive member, and wherein a second region between the lens and the light-transmissive member is provided with no first inorganic adhesive member.

8. The light-emitting device according to claim 1, wherein the first inorganic adhesive member is disposed at a position not overlapping the light-emitting element in a top view.

9. The light-emitting device according to claim 1, wherein the first inorganic adhesive member is disposed in a plurality of regions spaced apart from each other.

10. The light-emitting device according to claim 1, wherein an area of a region of overlap between the first inorganic adhesive member and the lens is 20% or less of an area of the lens in a top view.

11. The light-emitting device according to claim 1, wherein the first inorganic adhesive member is disposed throughout between the light-transmissive member and the lens.

12. The light-emitting device according to claim 2, wherein the light-transmissive member contains sapphire.

13. The light-emitting device according to claim 2, further comprising a second inorganic adhesive member disposed on the upper surface of the base member and bonding the light-transmissive member and the base member, wherein the second inorganic adhesive member has a frame shape.

14. The light-emitting device according to claim 1, wherein the thickness of the flange portion is 80% or less of the thickness of the light-transmissive member.

15. The light-emitting device according to claim 1, wherein the light-emitting element has a substantially rectangular shape in the top view, wherein a bisector of an angle of a vertex of the light-emitting element substantially perpendicularly intersects a side of the base member in the top view.

16. The light-emitting device according to claim 1, wherein the corner portions of the lens are rounded in the top view.

17. The light-emitting device according to claim 1, wherein the first inorganic adhesive member contains an inorganic material as a base material.

18. The light-emitting device according to claim 17, wherein the inorganic material is selected from the group consisting of ceramic-based materials, cement-based materials, sodium silicate, and aluminum phosphate.

19. The light-emitting device according to claim 1, wherein a mixture containing silica and an alkali metal is used as the inorganic material.

20. The light-emitting device according to claim 1, wherein the first inorganic adhesive member contains gold tin, a solder alloy, gold paste or a brazing filler metal as a base material.

* * * * *